United States Patent

[11] 3,619,636

[72] Inventor Woo Foung Chow
Berkeley Heights, N.J.
[21] Appl. No. 42,333
[22] Filed June 1, 1970
[45] Patented Nov. 9, 1971
[73] Assignee Bell Telephone Laboratories, Incorporated
Murray Hill, N.J.

[54] MAGNETIC DOMAIN LOGIC CIRCUIT
7 Claims, 7 Drawing Figs.

[52] U.S. Cl. .......... 307/88 TF, 340/174 TF
[51] Int. Cl. .......... G11c 11/14
[50] Field of Search .......... 340/174 TF; 307/88 LC, 88 TF

[56] References Cited

UNITED STATES PATENTS

| | | | |
|---|---|---|---|
| 3,460,116 | 8/1969 | Bobeck et al. | 340/174 |
| 3,518,643 | 6/1970 | Perneski | 340/174 |
| 3,541,534 | 11/1970 | Bobeck et al. | 340/174 |
| 3,555,527 | 1/1971 | Perneski | 340/174 |

OTHER REFERENCES

IBM Tech. Discl. Bulletin entitled " Bubble Splitter," by Levi, Vol. 13, No. 9, February 1971, page 2711

*Primary Examiner*—Thomas A. Robinson
*Attorneys*—R. J. Guenther and Kenneth B. Hamlin

ABSTRACT: A multiple input magnetic domain OR circuit is described. The circuit is defined in a sheet of material in which single wall domains can be moved by changing magnetic pole patterns in a magnetically soft overlay. The overlay includes a common element which serves as a terminus for a number of domain shift registers. The element is structured to accept only a single domain for providing an output.

INVENTOR
W. F. CHOW
BY Herbert M. Shapiro
ATTORNEY

MAGNETIC DOMAIN LOGIC CIRCUIT

FIELD OF THE INVENTION

This invention relates to data processing arrangements, and more particularly to such arrangements including a material in which single wall domains can be moved.

BACKGROUND OF THE INVENTION

A single wall domain is a magnetic domain encompassed, in the plane of a material in which it can be moved, by a domain wall which closes on itself to form a stable entity free to move in the plane. A typical material for such an arrangement is a rare earth orthoferrite or a garnet crystal having a preferred direction of magnetization along an axis out of the plane of movement, nominally normal to the plane. It is convenient to designate one direction along the (viz, positive direction) as the direction of the magnetization of the domain, the remainder of the material having its magnetization in the negative direction. Such a convention permits a domain to be represented as an encircled plus sign in a field of negative signs or merely as a circle which is the case in the following description. A single wall domain and an arrangement for manipulating such domains is disclosed in U.S. Pat. No. 3,460,116, of A. H. Bobeck, U. J. Gianola, R. C. Sherwood and W. Shockley, issued Aug. 5, 1969.

Single wall domains in a given sheet of material are constrained to a given diameter typically by a bias field of a polarity to constrict domains —a negative polarity according to the assumed convention. Domains are moved in the sheet by a field viz a field gradient) which is provided in positions consecutively offset from the position occupied by a domain.

One implementation for providing a suitable field gradient for affecting domain movement employs an overlay of magnetically soft material which exhibits changing magnetic pole patterns in response to a magnetic field reorienting in the plane of the sheet in which single wall domains can be moved. The geometry of the overlay and the consecutive orientations of the in-plane field determine the consecutive positions for attracting magnetic poles and thus the consecutive position for domain patterns in the sheet. For a rotating in-plane field, T-shaped and bar overlay geometries have been found particularly suitable for defining a domain propagation channel. A domain propagation arrangement of this type is disclosed in copending application Ser. No. 732,705, filed May 28, 1968 for A. H. Bobeck now U.S. Pat. No. 3,534,347.

The advantage of a domain propagation arrangement defined by magnetically soft overlays is that a spatially distributed propagation field pattern is achieved in the absence of electrical conductors resulting, for example, in a relatively simple and inexpensive arrangement particularly suited as a disc file. But the absence of electrical conductors implies that the arrangement is characterized by a field pattern uniformity which does not easily admit to localized modification for achieving a discrete function.

One discrete function which would be desirable in such an arrangement is a logic function. Of course, localized field modifications can be achieved by adding electrical conductors. Not only are the conductors expensive but, particularly for materials where domain size is small (say one-tenth mil), currents in the conductors produce unwanted effects because of the close proximity of domains to one another. MOst desirably, it would be advantageous to implement logic functions without conductors.

In this respect, the spatially distributed overlay arrangement allows a number of degrees of freedom—operational parameters which may be varied to achieve some selectivity in operation. Thus, for example, the in-plane field can be increased at a particular orientation to cause a domain generation or a channel switching operation. In each of these instances, however, the overlay geometry is designed to produce the desired operation in response to the augmented in-plane field. Copending application Ser. No. 756,210, filed Aug. 29, 1968 for A. J. Perneski now U.S. Pat. No. 3,555,527 discloses one of these arrangements. In other overlay arrangements, the need for augmenting the in-plane field is eliminated as disclosed in copending application Ser. No. 795,148, filed Jan. 30, 1969 for R. H. Morrow and A. J. Perneski, now U.S. Pat. No. 3,577,131. In this instance the geometry of the overlay alone determines certain logic functions. The realization of a number of logical functions as defined by the geometry of a magnetically soft overlay without electrical conductors extends the capability of an otherwise quite simple and attractive domain propagation arrangement.

BRIEF DESCRIPTION OF THE INVENTION

A magnetically soft overlay is configured, in accordance with one embodiment of this invention, to provide a multiple input logical OR function. An elongated magnetically soft overlay element is of a geometry to move a (seed) domain about its periphery in response to a rotating in-plane field and is disposed at the termini of a number of domain propagation channels defined by T-shaped and bar overlay elements. A domain advanced along any channel provides a seed domain for movement about the periphery of the elongated element. Any other domains simultaneously arriving at the elongated elements are merged into the first. The domain is moved about the periphery of the elongated element to an output position in a single in-plane field cycle providing a domain at the output. An annihilate conductor eliminates the seed domain thus reinitiating the circuit. BRIEF DESCRIPTION OF THE DRAWING FIG. 1 is a schematic illustration of a multiple input logical OR circuit in accordance with this invention; and FIGS. 2A, 2B, 2C, 2D, 2E, and 2F are schematic illustrations of portions of the circuit of FIG. 1 indicating the magnetic conditions in those portions during operation.

DETAILED DESCRIPTION

Figure 1:
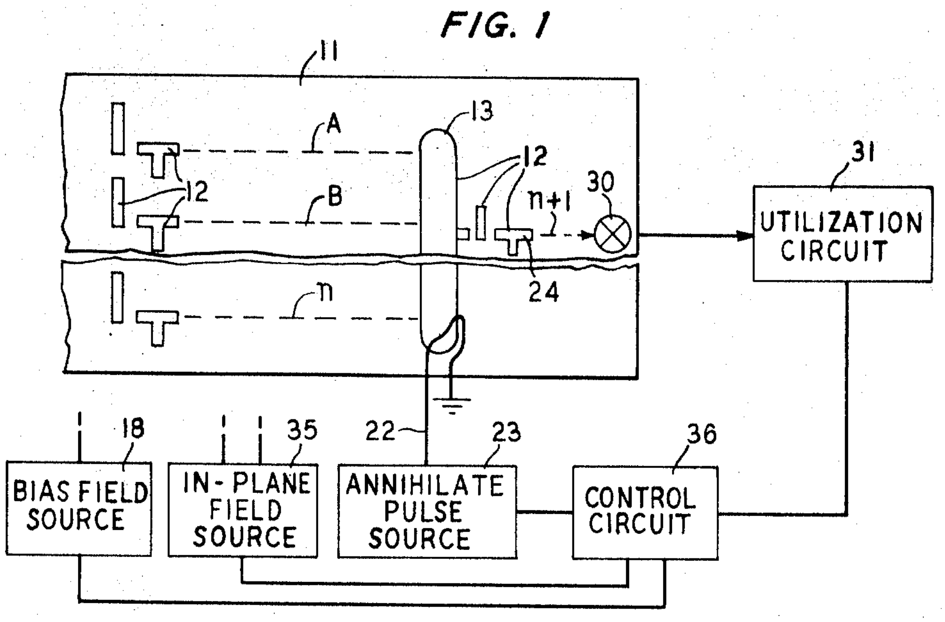

FIG. 1 shows a multiple input logical OR circuit in accordance with this invention. The circuit is defined in a sheet or slice 11 of a material in which single wall domains can be moved. To be specific, magnetically soft overlay elements 12, typically low coercive force permalloy, define a plurality of domain propagation channels, designated A, B,...*n* in FIG.. 1 along with an elongated element 13 which defines a common terminal element for the channels. A single channel 7+1 is shown extending from element 13 to the right to an encircled X which represents an output position.

Conceptually, the OR circuit of FIG. 1 employs a common overlay element of a geometry to form only a single domain if a domain is present in one or more of a plurality of domain propagation channels associated with it. The operation assumes the presence of domain patterns in the channels A, B,...*n* of FIG. 1 as would be the case typically. The source of the patterns as well as the movement of the patterns in response to a reorienting in-plane field is well understood in the art and is not discussed further here. We will direct our attention to the operation when a representative domain D of FIG. 2A moves to the end of channel *n* in response to the reorientation of an in-plane field to a downward position as indicated by the downward directed arrow H of that figure.

When the field is so oriented, attracting magnetic poles (represented as plus signs) are generated in the overlay elements having long dimensions aligned with the field. The pertinent elements are elements 13 and 15 of FIG. 2A. This is consistent with the assumed position of domain D in that figure.

Figure 2A:
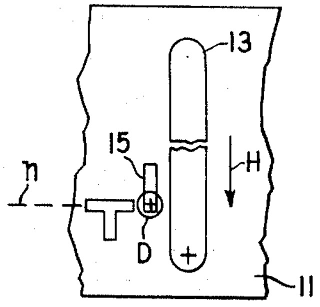
Figure 2B:
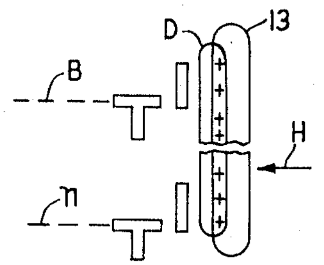

The operation assumes an in-plane field rotating clockwise as viewed in the sequence of FIGS. 2A through 2F. FIG. 2B, therefore, shows arrow H, representing the in-plane field, directed to the left. A diffuse attractive pole forms over the entire left edge of element 13 in response. Domain D conforms to the pole configuration. It is important to note, at this juncture in the operation, that the pole distribution and domain D extend over the entire distance of element 13 and thus presents a common terminal element for a domain in any one of the channels A...*n*.

Figure 2C:
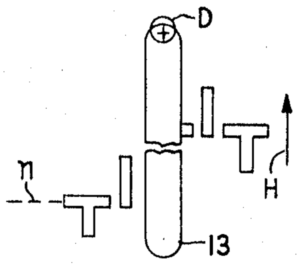

FIG. 2C shows the in-plane field as directed upward generating a strong attractive pole at the top of element 13 as viewed in the figure. Domain D moves to the position of the pole returning to a constricted geometry of a circle. The diameter of the domain at this juncture, as in FIG. 2A, is determined conveniently by a bias field of a polarity to construct domains and generated by familiar means represented by block 18 of FIG. 1.

Figure 2D:
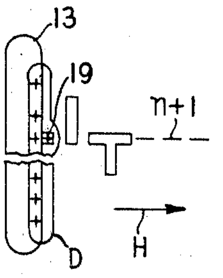

FIG. 2D shows the in-plane field oriented to the right as viewed. Domain D again is stretched out to conform to the resulting diffuse pole. In this instance, the domain is distorted at extension 19 of element 13, as shown in the figure, because of the relatively high pole concentration there.

Figure 2E:
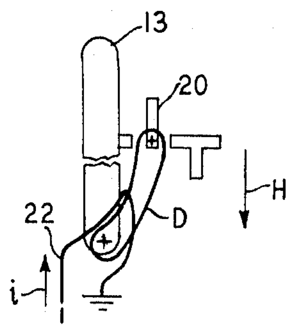
Figure 2F:
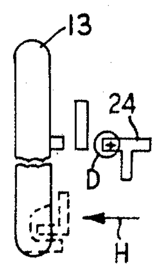

When the in-plane field next reorients downward as shown in FIG. 2E, the top end of domain D latches onto a strong pole generated at the bottom of element 20 as shown in the figure. The bottom of the domain similarly latches onto a strong pole at the bottom of element 13. Domain D, of course, is stretched between the two latching points assuming a shape generally as shown in the figure.

FIG. 2E also shows a conductor 22 shown also in FIG. 1, connected between an annihilate pulse source 23 and ground. Source 23 pulses conductor 22 when domain D is in the position shown in FIG. 2E. The pulse is of a polarity to collapse a domain requiring a current as indicated by the arrow designated *i* in FIG. 2E for the convention assumed. The result is a domain D to the left edge of overlay element 24 when the in-plane field is next reoriented to the left as indicated by the arrow in FIG. 2F. There is no domain on the periphery of element 13 at this juncture in the operation.

Domain D is advanced to the right along channel $n+1$ as the in-plane field continues to rotate arriving at an output position 30 symbolized by X in FIG. 1. Detection of the presence or absence of a domain 30 is accomplished by any one of a variety of familiar means such as by a planar Hall probe, an electrical conductor loop, or by optical means. Block 31 labeled "utilization circuit" in FIG. 1 represents any such circuit.

The foregoing description of the operation assumes the movement of a representative domain along channel *n* in response to a rotating in-plane field. But in practice a domain pattern would be moving along the channel A through *n* simultaneously. It is clear that the absence of a domain, a binary zero, does not modify the operation above because the operation as described may be thought of as involving the movement of binary zeros in all the channels except *n*.

The presence of a domain (binary one) in one of the other channels similarly fails to modify the operation as described. This is clear from FIG. 2B which indicates that domain D elongated over the entire distance of 13. Any domain approaching 13 at this juncture is absorbed by domain D. Thus, one or more domains moving simultaneously along the channels A...*n* can form only a single domain for movement about element 13 as the in-plane field rotates. This is due, of course, to the geometry and position of element 13.

The in-plane field is generated conveniently by two sets of series connected parallel coils disposed orthogonal to the plane of sheet 11 in FIG. 1 and pulsed in quadrature. This field generating arrangement is well understood in the art and is represented in FIG. 1 by a block 35 labeled "in-plane field source." Sources 18, 23, and 35 and circuit 31 are connected to a control circuit 36, as shown in FIG. 1, for activation and synchronization. The various sources and circuits may be any such elements capable of operating in accordance with this invention.

What has been described is considered only illustrative of the principles of this invention. Therefore, various modifications can be devised by those skilled in the art in accordance with those principles yet within the spirit and scope of this invention. For example, the domain at the periphery of element 13 as shown in FIG. 2E is eliminated illustratively by a pulse on conductor 22. It is possible to modify the geometry of element 13 to eliminate that domain without conductor 22. Element 13, in this case, would include an aperture in its lower right quadrant into which an L-shaped overlay element is inserted as disclosed in copending application Ser. No. 41,028 filed May 27, 1970 for I. Danylchuk. The output channel in this instance would be associated with an extension of element 13 below the aperture. This arrangement is shown dotted in FIG. 2F.

What is claimed is:

1. A magnetic domain logic arrangement comprising a sheet of material in which single wall domains can be moved, means for defining a plurality of propagation channels in said sheet for said domains, said last-mentioned means comprising magnetically soft overlay elements having a geometry and being disposed for exhibiting domain-attracting pole patterns which change in response to a reorienting in-plane field for moving domain patterns therealong, said arrangement also including an overlay element having a first portion disposed to accept domains from all of said channels and having a geometry to exhibit domain attracting poles over said entire first portion when said in-plane field is in an orientation to move domains from said channels to said first portion.

2. An arrangement in accordance with claim 1 wherein said overlay element having said first portion is an elongated magnetically soft element including an output position.

3. An arrangement in accordance with claim 2 including a plurality of magnetically soft overlay elements for moving domains from said output position to a detector in response to said reorienting in-plane field.

4. An arrangement in accordance with claim 3 wherein said means for defining a plurality of channels comprises T-shaped and bar overlay elements disposed with respect to one another to move domain patterns therein in response to a rotating in-plane field, and means for providing said rotating in-plane field.

5. An arrangement in accordance with claim 4 including means for annihilating a domain coupled to said overlay element having said first portion for each rotation of said in-plane field.

6. An arrangement in accordance with claim 5 wherein said last-mentioned means comprises a conductor for generating in said sheet at the periphery of said element having said first portion a field to collapse a domain there.

7. A magnetic domain logic circuit comprising
- a sheet of material in which single wall domains can be moved,
- a magnetically soft overlay of a geometry to define a plurality of domain propagating channels in said material, each having a terminus,
- a reorienting in-plane magnetic field for moving domains in said channels,
- a magnetically soft overlay of a geometry and disposed at said termini for forming at the periphery thereof a single domain if a domain is present at any one of said termini,
- means for detecting said single domain, and
- means for eliminating domains at the periphery of said elongated element.

* * * * *